United States Patent [19]

Telfer

[11] Patent Number: 4,820,425
[45] Date of Patent: Apr. 11, 1989

[54] LIQUID SENSOR FOR ROBOTIC FILTRATION STATION

[75] Inventor: Alexander Telfer, Houston, Tex.

[73] Assignee: Shell Oil Company, Houston, Tex.

[21] Appl. No.: 149,254

[22] Filed: Jan. 28, 1988

[51] Int. Cl.$^4$ ............................................. C02F 1/52
[52] U.S. Cl. ................................. 210/746; 73/61 R; 210/87; 324/61 R; 340/620
[58] Field of Search .................. 73/61 R; 210/87, 97, 210/104, 746; 324/61 R; 340/604, 620

[56] References Cited

U.S. PATENT DOCUMENTS

| 3,563,382 | 2/1971 | Regent ............................ 210/104 X |
| 3,863,147 | 1/1975 | Evath ............................ 324/61 R X |
| 3,878,461 | 4/1975 | Saint-Andre ...................... 324/61 R |
| 4,644,665 | 2/1987 | Naunapper et al. .......... 324/61 R X |
| 4,662,220 | 5/1987 | Laue ............................ 324/61 R X |

Primary Examiner—Charles Hart

[57] ABSTRACT

A capacitance liquid sensor for a filtration station for a robotic liquid analyzer detects conclusion of the fluid filtration step by return of the capacitance in the station to its original value.

17 Claims, 1 Drawing Sheet

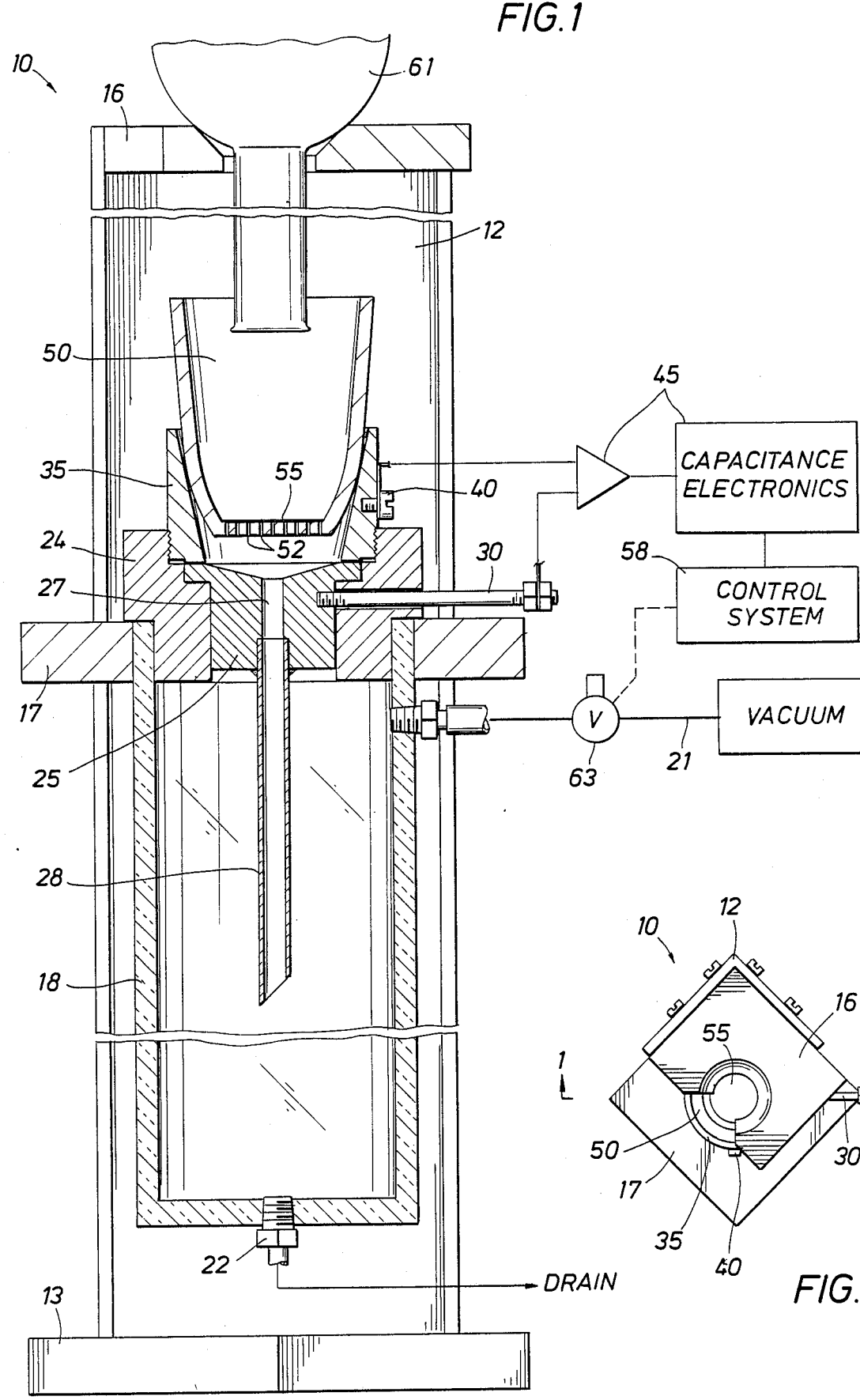

LIQUID SENSOR FOR ROBOTIC FILTRATION STATION

BACKGROUND OF THE INVENTION

The present invention relates to robotic systems for use in automated laboratory applications, and more particularly to a liquid sensor for a filtration station for use in automated analytical laboratory systems. The liquid sensor detects when filtration of the liquid has completed, independently of the time required for the liquid to be filtered, by detecting when the liquid has finished passing through the filter in the filtration station.

Automation in analytical laboratories is not, of itself, a new concept, but instead has been widely practiced for many years. More recently, it has appeared mainly in the form of microprocessor controlled analytical instrumentation with dedicated hardware, such as auto samplers, continuous flow systems, and computerized data collection, calculation, and report generation facilities. The very recent past has seen important improvements wherein laboratory automation has been extended by the use of robotics, combined with programmable computers, to new tasks which include sample preparation, and even entire analytical determinations. The first such robotic system was introduced in 1982 by Zymark Corporation (Hopkinton, Massachusetts). As experience has been gained with these systems, they have been successfully applied to ever more sophisticated laboratory operations, and the number of accessory components for specific tasks has grown accordingly.

Understandably, however, there is a great need for accessory modules and equipment which can provide sophisticated support operations in a robot-friendly manner. Tasks which are so trivial for a human operator that they essentially go unnoticed may prove to be all but insurmountable for a robotics system. Sometimes the most trivial and routine manual operations turn out to be the most intransigent when efforts are made to perform then with robot-friendly modules and sensors. As a result, modules and sensors for performing many important tasks are still not yet commercially available.

An example has to do with the filtration of liquids, and in particular the filtration of a sample through an extremely fine filter for measuring suspended solids. Environmental Protection Agency requirements, such as in the EPA approved protocol specified in the manual procedure US EPA method 160.2, for the determination of total suspended solids (TSS) in water and waste water, is routinely performed at many manufacturing locations throughout the country, and in support of waste water treatment research and development studies. It is a routine EPS test procedure that is highly repetitive, usually involves a large number of samples to be analyzed, and requires the committed attention of the human analyst—a prime example of a procedure wherein robotic automation would be highly desirable.

For purposes of the present invention, it is not necessary to described the entire method and apparatus by which the total suspended solids may be determined in a robotic system, particularly because the liquid sensor of the present invention, as will be easily appreciated, can also be utilized in many other compatible robotics applications. The problem addressed by the present invention has to do with the sometimes highly variable amount of time required for a filtration step to take place, not only from one application or implementation to another, but often with the same procedural application itself.

In the context of the above-noted example, for instance, one liquid sample might have virtually no solids in suspension, while another might have a great deal. In both cases, the solids are understandably extremely small or they would not remain suspended, depending to some extent, of course, upon their density. Accordingly, the filter through which the liquid is passed will be extremely fine, and the liquid flow rate will be very slow. When the task is performed manually, the human operator has no difficulty in checking from time to time to observe when the filtration step has concluded. Such a seemingly trivial time-independent task, however, can present a formidable obstacle to the robotics system designer.

A need therefore remains for a liquid sensor for a filtration station for a robotics system for sensing when filtration of a liquid has completed, independently of the time required for the liquid to be filtered. Such a system should accurately detect when the liquid has finished passing through the filter in the filtration station such that liquids can be confidently filtered in the station substantially independently not only of time, but of vessel configuration, volume of liquid being filtered, and advantageously such that features such as a vacuum assist to accelerate the rate of filtration can be employed without interfering with the sensing and detection of conclusion of the filtration step. Further, detection should be non-intrusive and non-invasive to avoid contamination of the liquid.

SUMMARY OF THE INVENTION

Briefly, the present invention meets the above needs and purposes with a new and improved liquid sensor for a filtration station for a robotics system in which capacitance effects are utilized for sensing when filtration of the liquid has completed. More specifically, in the preferred embodiment, a pair of electrodes, is supported substantially adjacent the filter in the station. The upper electrode has a portion at least as high as the filter, and the lower electrode is adjacent the bottom of the upper electrode. Both are connected to a monitoring system which includes capacitance electronics for determining the initial or base inter-electrode capacitance of the electrodes before the liquid is present. When liquid is then introduced into the filtration station, the capacitance measured in the vicinity of the filter changes significantly as the air in the capacitor gap is replaced by the liquid.

The monitoring means then periodically samples the capacitance of the electrodes. When substantially all the liquid being filtered has passed through the filter, air once again becomes the major material in the capacitor gap. The monitoring means then detects that the inter-electrode capacitance has returned substantially to the original base capacitance and generates an indication that the liquid has finished passing through the filter in the filtration station. This monitoring and detection of the completion of the filtration operation occurs independently of the time required for the liquid to pass through the filter. The invention thus operates independently, not only of time, but of vessel configuration, the volume of the liquid being filtered, the viscosity of the liquid, the amount of filtrate removed from the liquid, and so forth.

In the preferred embodiment, the electrodes themselves are configured to conveniently support the filter-containing vessel therein. In addition, the filtration station includes a vacuum system for applying vacuum beneath the filter for accelerating the filtration of the liquid through the filter. In normal operation, the monitoring means is coupled to the vacuum system to automatically terminate the vacuum substantially when completion of the filtration operation has been detected.

It is therefore an object of the present invention to provide a new and improved method and apparatus for liquid sensing for a filtration station, for sensing when filtration of a liquid is completed, independently of the time required for the liquid to be filtered; such a method and apparatus which can thus accurately detect when the liquid has in fact finished passing through the filter in the filtration station; in which an upper electrode is supportable substantially adjacent the filter in the station; in which a lower electrode is positioned substantially adjacent the upper electrode; in which a monitor, including capacitance electronics connected to the electrodes, determines the base inter-electrode capacitance of the electrodes before the liquid is present at the electrodes; in which the monitor then subsequently indicates when substantially all of the liquid being filtered has passed through the filter by detecting when the inter-electrode capacitance has returned substantially to the original base capacitance; in which this determination is made independently of the time required for the liquid to pass through the filter; in which the lower electrode may be positioned just below the filter; in which means can be provided for additionally supporting the filter between the electrodes; in which the upper electrode can be configured for removably supporting a filter-containing vessel therein, such as a crucible; in which a support can also be provided for supporting an inverted container of liquid above the filter in the filtration station; in which a vacuum applying means can be included for applying a vacuum beneath the filter in the station for accelerating the filtration of the liquid through the filter; in which application of the vacuum can be terminated automatically substantially when the monitor indicates that the liquid being filtered has passed through the filter; and to accomplish the above objects and purposes in an inexpensive, uncomplicated, durable, versatile, and reliable method and apparatus, inexpensive to manufacture and implement, and widely suited to the widest possible utilization in robot-friendly procedures and environments.

These and other objects and advantages of the invention will be apparent from the following description, the accompanying drawings, and the appended claims.

BRIEF DESCRIPTION OF THE DRAWINGS

FIG. 1 is a cross-sectional view, taken generally on line 1—1 in FIG. 2, of a liquid sensor according to the present invention incorporated into a robot-friendly filtration station; and FIG. 2 is a top view of the station illustrated in FIG. 1, but with the flask omitted for clarity of illustration.

DESCRIPTION OF THE PREFERRED EMBODIMENT

With reference to the drawings, the new and improved liquid sensor for a filtration station, and the method therefor according to the present invention, will be described. FIG. 1 shows a station 10 in which back wall 12, open in the front and resting on a base 13, supports a flask holder 16 at the top of the station 10. Intermediate between the base 13 and flask holder 16 is a vacuum cylinder support block 17, from which a vacuum cylinder 18, connected to a vacuum line 21 and a drain 22, is suspended.

Resting upon the vacuum cylinder support block 17 is a coupling member 24 made of insulating material such as PVC. Resting upon the coupling member 24, in turn, is a lower electrode 25 which, in the preferred embodiment, has a liquid-conducting bore 27 through the center thereof in line with a stem 28 which extends from the bottom thereof into the vacuum cylinder 18. A terminal 30 is connected to the lower electrode 25 and extends outwardly therefrom through the coupling member 24, being thereby insulated from contact with any other metallic components in station 10.

The lower electrode 25 is positioned substantially adjacent the bottom of an upper electrode 35, also supported by the coupling member 24. Upper electrode 35 has a terminal 40 so that the electrodes 25 and 35 through their respective terminals 30 and 40 can be connected to a suitable capacitance electronics system 45. Suitable capacitance measuring equipment is readily available, an example being the Amprodux Model X4, ML15 (Amprodux Inc., New York, N.Y.).

As can also be seen in FIG. 1, the upper electrode 35 is preferably of an open, hollow shape such that it can support therein a suitable filter-containing vessel such as a crucible 50. The bottom of crucible 50 is perforated by numerous small holes 52, whereby the crucible functions as a means substantially between the electrodes for supporting a filter element 55 therein for filtering the liquid (not shown) as it flows past the electrodes 25 and 35 and through the filter 55.

The operation of the invention thus proceeds as follows. Under the control of the robotics control system 58, the robot arm (not shown) places the crucible 50 or other suitable filter support in the upper electrode 35, and then inverts a flask 61 of fluid over the crucible 50 so that it drains through the filter 55. To expedite draining of the liquid, control system 58 can also open a vacuum control valve 63 while the liquid is being filtered through the filter 55.

Detection of the conclusion of the filtering process then proceeds as follows. In the preferred embodiment of the present invention, with the filter positioned in the station substantially adjacent the electrodes, as shown in FIG. 1 and described above, the base inter-electrode capacitance of the assembly is determined before the liquid is introduced from flask 61. Then the liquid is introduced into the system (into crucible 50). Since the dielectric constant of the liquid will be different from that of the air which it displaces (and dramatically so if the liquid is water), the inter-electrode capacitance will change significantly, and this is easily registered by the capacitance electronics 45. Following introduction of the liquid, the inter-electrode capacitance is monitored, either continuously or periodically as desired, until it has substantially returned to the original or base capacitance measured earlier. Such a return to the base capacitance level indicates that the material in the vicinity of the electrodes is once again air, and that the liquid has therefore concluded its passage through the filter 55. The control system 58 then responds accordingly, moving ahead to the next steps in the operation, which typically involve using the robot to remove the flask 61 and crucible 50 for further processing within the system, such as analyzing the filter for the filtrate material it has caught.

Advantageously, before the crucible 50 and filter 55 are removed, the flask can be refilled several times with a rinse liquid and returned to the station to assure that all of the solids have been transferred from the flask to the filter 55. With each such rinse, the invention provides confidence that the associated filtration operations will proceed to completion regardless of the time required for the liquid to pass through the filter. Each such operation, as suggested above, is preferably assisted by applying vacuum to the vacuum cylinder 18 after the flask 61 has been positioned above the crucible 50, and terminating the vacuum when the capacitance electronics 45 and control system 58 have determined as described above that the liquid being filtered has passed through the filter 55.

As may be seen, therefore, the present invention has numerous advantages. Principally, it provides a very reliable, time-independent method and apparatus for use in a robotic analyzer to provide a robot-friendly filtration station. In an uncomplicated yet highly effective and reliable manner, the present invention accomplishes a task which, for a human operator, is trivial but for a robotics system has proven to be extremely difficult to perform. It is non-intrusive and non-invasive, so there is no contamination of the liquid. Also, the electrode configuration may be varied as desired, such as split vertically rather than horizontally, etc. Due to the economy, versatility, and effectiveness of the present invention, therefore, it is expected that it will find ready application in a great variety of robotics analysis applications.

Accordingly, while the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A sensor for a filtration station for sensing when filtration of a liquid has completed, independently of the time required for the liquid to be filtered, by detecting when the liquid has finished passing through the filter in the filtration station, comprising:
   (a) a first electrode supportable substantially adjacent the filter in such a station;
   (b) a second electrode positioned substantially adjacent said first electrode; and
   (c) monitoring means including capacitance electronics means connected to said electrodes for determining the base inter-electrode capacitance of said electrodes before such liquid is present at said electrodes, and for subsequently indicating when substantially all of the liquid being filtered has passed through the filter by detecting when the inter-electrode capacitance has returned substantially to said original base capacitance, independently of the time required for the liquid to pass through the filter.

2. The apparatus of claim 1 wherein said second electrode is positioned just below the filter.

3. The apparatus of claim 1 further comprising means between said electronics for supporting such a filter substantially therebetween for filtering the liquid as it flows past said electrodes through the filter.

4. The apparatus of claim 1 wherein said first electrode is configured for removably supporting a filter-containing vessel therein.

5. The apparatus of claim 4 wherein said first electrode is configured for removably supporting a filter-containing crucible therein.

6. The apparatus of claim 1 wherein said filtration station further comprises means for supporting an inverted container of liquid therein above the filter in the station.

7. The apparatus of claim 1 wherein said filtration station further comprises means for applying a vacuum beneath the filter in the station for accelerating the filtration of the liquid through the filter.

8. The apparatus of claim 7 further comprising means for terminating said vacuum substantially when said monitoring means indicates that the liquid filtered has passed through the filter.

9. For use in a robotic analyzer, a capacitative liquid sensor for a filtration station for automatically sensing when filtration of a liquid has completed, independently of the time required for the liquid to be filtered, by detecting when the liquid has finished passing through the filter in the filtration station, comprising:
   (a) an upper electrode supportable substantially adjacent and with at least a portion thereof just above the filter in such a station;
   (b) a lower electrode positioned substantially adjacent the bottom of said upper electrode and just below the filter;
   (c) means incorporated in said upper electrode for removably supporting a filter-containing crucible therein;
   (d) means for supporting an inverted container of liquid in the station above such a crucible;
   (e) means for applying a vacuum beneath the filter in the station for accelerating the filtration of the liquid through the filter;
   (f) monitoring means including capacitance electronics means connected to said electrodes for determining the base inter-electrode capacitance of said electrodes before such liquid is present at said electrodes, and for subsequently indicating when substantially all of the liquid being filtered has passed through the filter by detecting when the inter-electrode capacitance has returned substantially to said original base capacitance, independently of the time required for the liquid to pass through the filter; and
   (g) means for terminating said vacuum substantially when said monitoring means indicates that the liquid being filtered has passed through the filter.

10. A method for sensing when filtration of a liquid has completed in a filtration station, independently of the time required for the liquid to be filtered, by detecting when the liquid has finished passing through the filter in the filtration station, comprising:
   (a) determining the base inter-electrode capacitance of first and second electrodes supportable substantially adjacent the filter, before such liquid is present at the electrodes, the second electrode being positioned substantially adjacent the first electrode; and
   (b) after such liquid is present at the electrodes, subsequently indicating when substantially all of the liquid being filtered has passed through the filter by detecting when the inter-electrode capacitance has returned substantially to the original base capacitance, independently of the time required for the liquid to pass through the filter.

11. The method of claim 10 wherein the second electrode is positioned just below the filter. +

12. The method of claim 10 further comprising removably supporting a filter-containing vessel in the first electrode.

13. The method of claim 10 further comprising removably supporting a filter-containing crucible in the first electrode.

14. The method of claim 10 further comprising supporting an inverted container of liquid above the filter in the station.

15. The method of claim 10 further comprising applying a vacuum beneath the filter in the station for accelerating the filtration of the liquid through the filter.

16. The method of claim 15 further comprising terminating the vacuum substantially when the liquid being filtered has passed through the filter.

17. A capacitative method for use in a robotic analyzer filtration station for automatically sensing when filtration of a liquid has completed, independently of the time required for the liquid to be filtered, by detecting when the liquid has finished passing through the filter in the filtration station, comprising:

(a) with capacitance electronics means connected to upper and lower electrodes supportable substantially adjacent the filter, determining the base inter-electrode capacitance of the electrodes before such liquid is present at the electrodes, the upper electrode having at least a portion thereof just above the filter, and the lower electrode being positioned substantially adjacent the bottom of the upper electrode and just below the filter;

(b) removably supporting a filter-containing crucible in the upper electrode;

(c) supporting an inverted container of liquid in the station above the crucible;

(d) applying a vacuum beneath the filter in the station for accelerating the filtration of the liquid through the filter;

(e) after such liquid is present at the electrodes, subsequently indicating when substantially all of the liquid being filtered has passed through the filter by detecting when the inter-electrode capacitance has returned substantially to the original base capacitance, independently of the time required for the liquid to pass through the filter; and (f) terminating the vacuum after the inter-electrode capacitance has returned substantially to the original base capacitance.

* * * * *